US005290487A

United States Patent [19]

Ludwig

[11] Patent Number: 5,290,487

[45] Date of Patent: Mar. 1, 1994

[54] DEVICE FOR AERATION OF A LIQUID VESSEL

[76] Inventor: Scheibinger Ludwig, Alfonsstr.7a, D8000 München, Fed. Rep. of Germany, D 8000

[21] Appl. No.: 39,469

[22] PCT Filed: Aug. 20, 1992

[86] PCT No.: PCT/CS92/00024

§ 371 Date: Apr. 26, 1993

§ 102(e) Date: Apr. 26, 1993

[87] PCT Pub. No.: WO93/04770

PCT Pub. Date: Mar. 18, 1993

[30] Foreign Application Priority Data

Aug. 30, 1991 [CS] Czechoslovakia .................... 2688-91

[51] Int. Cl.[5] ............................ B01F 3/04; C02F 3/20

[52] U.S. Cl. .............................. 261/122.1; 261/122.2; 210/236

[58] Field of Search .......................... 261/122.2, 122.1; 210/236

[56] References Cited

U.S. PATENT DOCUMENTS

| | | | |
|---|---|---|---|
| 3,880,965 | 4/1975 | Dudis et al. | 261/122.1 |
| 3,977,606 | 8/1976 | Wyss | 261/122.2 |
| 4,960,546 | 10/1990 | Tharp | 261/124 |
| 5,059,358 | 10/1991 | Tharp | 261/122.2 |
| 5,160,460 | 11/1992 | Goetz et al. | 261/122.1 |

*Primary Examiner*—Tim Miles

*Attorney, Agent, or Firm*—Weingarten, Schurgin, Gagnebin & Hayes

[57] ABSTRACT

A device for aeration of a liquid vessel comprising at least one guide rail /2/ and a plurality of sliders /3/ arranged thereon and the sliders /3/ include holders carrying at least one hose of which at least a portion is perforated and the device further comprises pulling means for pulling the hose /5/ into the empty or liquid containing vessel to its working position. The hose /5/ is movable along its axis with respect to said holders /4/ wherein the holders /4/ have a closed circular shape and their sliders /3/ are connected to pulling means /6/.

13 Claims, 2 Drawing Sheets

DEVICE FOR AERATION OF A LIQUID VESSEL

BACKGROUND OF THE INVENTION

The invention relates to a device for aeration of a liquid vessel comprising at least one guide rail and a plurality of sliders arranged thereon and the sliders include holders carrying at least one hose of which at least a portion is perforated and the device further comprises pulling means for the hose.

DESCRIPTION OF THE PRIOR ART

Various aeration systems comprising a special aeration body have been disclosed in the prior art. Due to a rather complicated structure of the aeration body the costs for manufacture, installation and maintenance of such systems are relatively high.

Other known aeration systems comprise an aeration body formed of a hose or plurality of hoses. Each hose is provided by perforation enabling delivery of the air into the environment of a vessel. In one embodiment the hose is located in a guide of an U-section profile, in another embodiment the hose is provided by holders with sliders which are guided inside or upon a rail. The hose is fixed to the holders mostly by a glue. The application of hoses enables in principle to provide an unlimited aeration capacity. Nevertheless, it also involves certain problems arising specifically in connection with the application of hoses in the described manner.

The hoses located for example in a guide of an U-section profile are preloaded what results not only in reduction of the service life of a hose, but also adversely affects the dimension of the perforation holes and as the case may be causes plastic deformation of the hose. However, the preloading of the hose is necessary by the known arrangements for example in the situation when the passing section or the perforation holes of the hose are to be cleaned.

An undesired preloading of the hose along with all the adverse effects occur also with the other above described system comprising holders, firstly when the hose is being pulled into its working position. For certain time, the perforation holes are thus broadened what gives birth to the increased penetration of liquid into the hose when the air pressure in the hose drops and simultaneously to the expansion of air bubbles what results in reduction of the exploitation of oxygen and consequently impairs the aeration effect. From the long-term point of view the same consequences arise as by the previous described system and the common effect is the reduction of the service life of the hose.

Another disadvantage of the embodiment with the hose carried by holders is seizing or jamming of sliders on the guide rail what may cause breakage of the hose. The remaining part of the hose cannot not be removed from the vessel unless the operation of the relevant equipment is discontinued.

SUMMARY OF THE INVENTION

The foregoing drawbacks are to the considerable extent avoided by a device for aeration of liquid vessel according to the invention comprising a perforated hose supported by holders which hose is movable along its axis with respect to said holders whereby the holders have a closed circular shape and their sliders are connected to pulling means.

Accordingly, the important object of the invention is to avoid any preloading of the hose even in the process of installation when the hose is pulled into its working position. The pulling means, for example a steel strand wire, connect the sliders of holders while the hose surrounded by holders is axially movable with respect to the holders and it is therefore impossible to initiate any stress in the hose.

Furthermore, when the pulling means consist of a strand wire, each slider is provided with a passage and a fastening bolt for fixing the wire to the slider. An advantage of such an arrangement is that a jamming or seizure of the slider in the rail is eliminated since its correct position with respect to the rail is secured by the fixed attachment to the strand wire. Alternatively the slider may be supported on the rail by means of a rolling element especially when all parts of the mechanism are heavy and massive.

Likely, in the embodiment where both ends of the hose are stiffened by a body inserted therein and the hose holders are at this place gripped by clamps, the life service of the entire hose is still extended. Moreover, the danger of a stress generation or a local stress generation is avoided and the correct axial position of the hose with respect to the system of holders and sliders is secured.

It is also possible to stiffen each portion of the hose which is bent when the hose is in the working position. The stiffening may be preferably effected by a resilient member arranged on the hose surface for example by a properly shaped spring or wire. Thus the necessity of using inserted pieces for ensuring the passage of air through the local bending of the hose, as is the case by the known devices, is avoided.

Another additional advantage of the invention is that the vibrations which usually occur in operation of the diaphragm aerating systems which systems have to be mounted upon a massive heavy base structure are reduced by the device according to the invention. Only minor pulsation of the hose without adverse effect on the fastening structure are produced. Thus the number of factors decreasing the life service of the device are reduced.

Lastly, an advantage of the described arrangement of the hose with respect to the holders is to be seen in the possibility of pulling out the hose from the holders only by prior loosing the clamps at both ends of the hose provided with stiffening. That makes possible to use for installation of a new hose the instant holders and sliders still arranged at the rail. The maintenance of the hose brings no problems since it may be performed, including replacement of the hose by a new one, during the normal operation of the respective liquid vessel.

BRIEF DESCRIPTION OF THE DRAWINGS

For better understanding of the invention reference will now be made to the accompanying drawings whereas

DETAILED DESCRIPTION OF THE INVENTION

Figure 1:
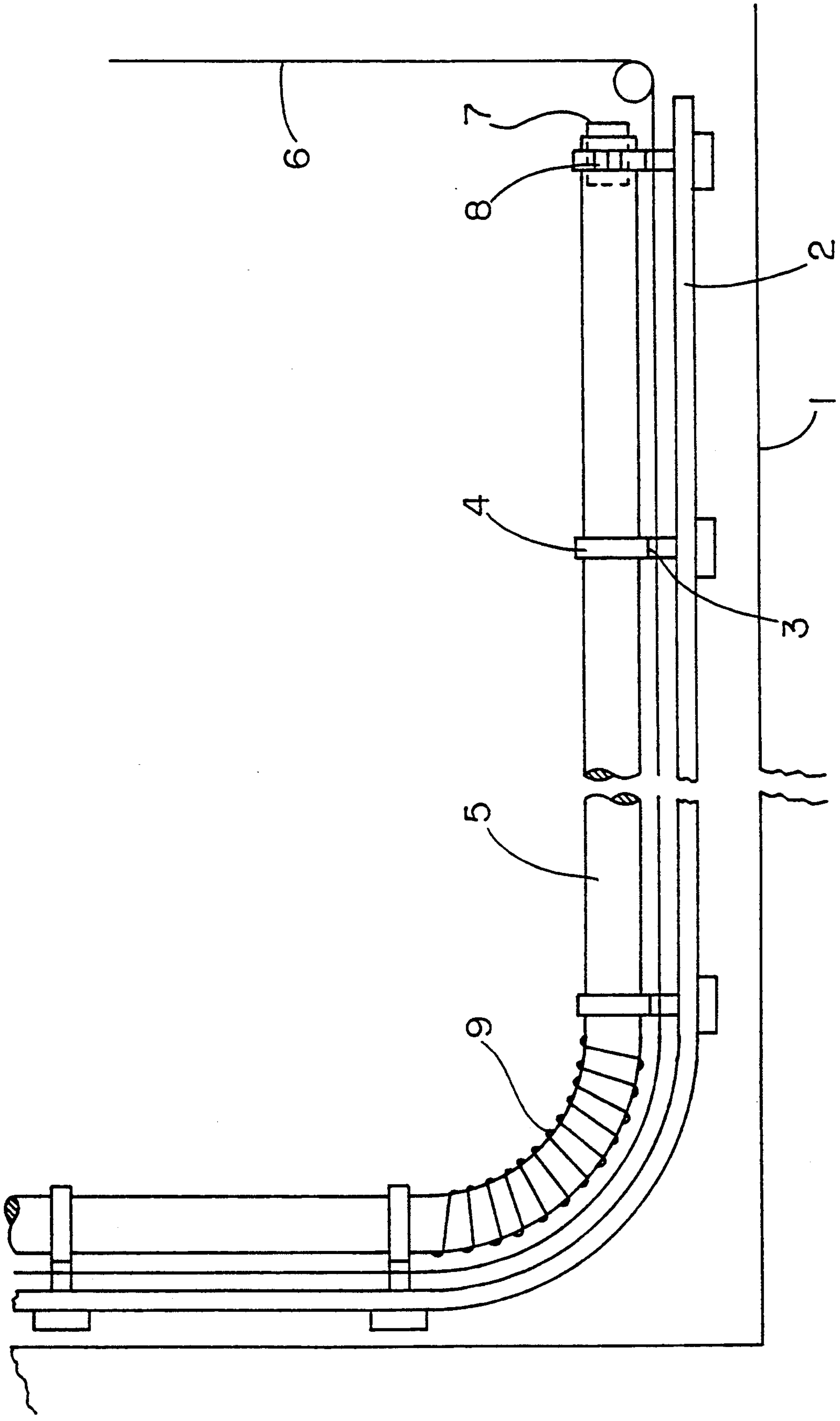
FIG. 1 is a diagrammatic side elevation view showing the positioning of a hose including its bending.
Figure 2:
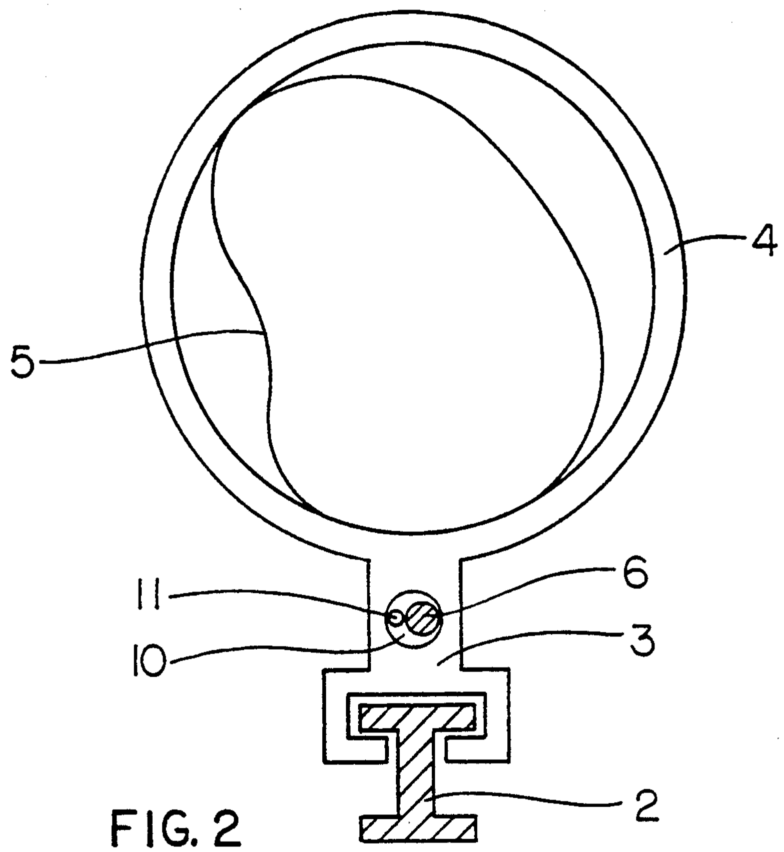
FIG. 2 is a cross-sectional view of the device and FIG. 3 is a cross-sectional view of the device at the place where the hose is stiffened by an inserted body.
Figure 3:
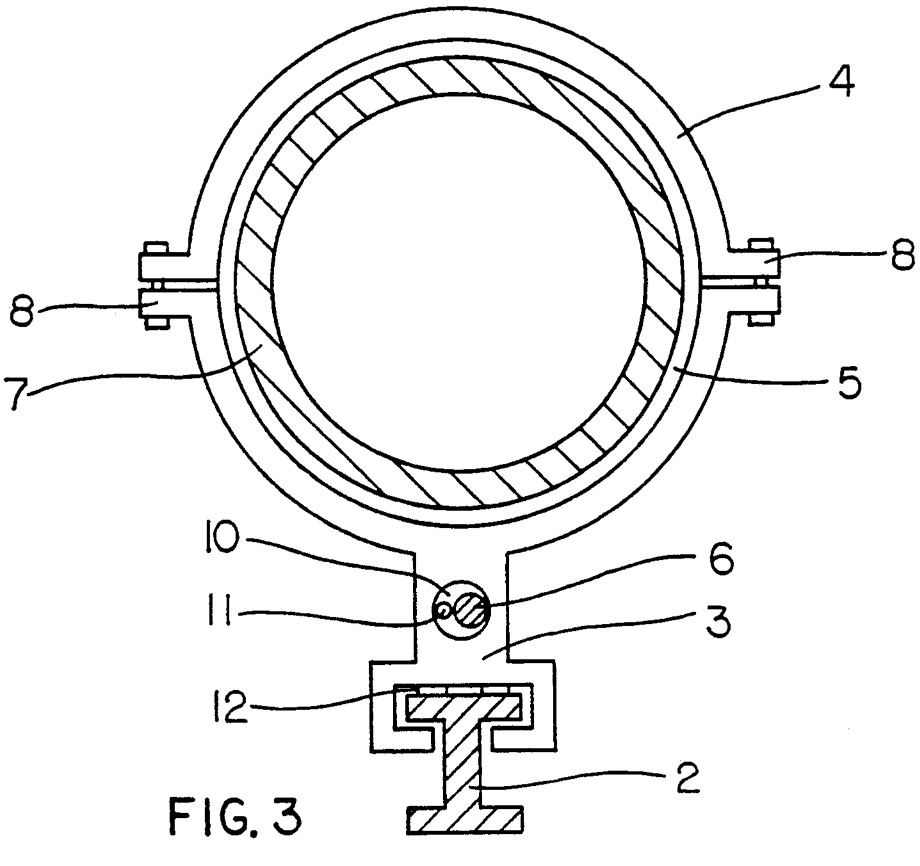

Referring to FIG. 1 a vessel 1 comprises a guide rail 2 which carries sliders 3. Each slider is provided by a holder 4 of a closed circular shape. There is a hose 5 arranged in holders 4 in a manner to enable its axial motion with respect to the holders 4. The sliders 3 of the holders 4 are mutually connected by pulling means 6, in this embodiment by a steel strand wire. The end of the hose 5 is stiffened by an inserted body 7 and the relevant holder 4 is provided by clamps 8. The portion of the hose 5 formed in the working position into bending and located above the corner of the vessel 1 is stiffened by a stiffening member 9, in this embodiment by a coiled spring surrounding the surface of the hose 5. FIG. 2 shows the guide rail 2 with the slider 3 and the holder 4 of the hose 5. A passing 10 is provided in the body of the slider 3 in which the pulling means 9, in this case a steel strand wire, are inserted. The constant stable position of the holder 3 with respect to the strand wire is secured by a fastening element 11, here by a bolt. FIG. 3 shows the arrangement of FIG. 2 which further comprises the inserted body 7, clamps 8, holder 4, hose 5 and a supporting rolling element 12 of the slider 3.

The hose 5 may be pulled into the vessel 1 for installation into its working position on the guide rail 2 without necessity to discharge the liquid from the vessel. The pulling force is exerted upon the sliders 3 spaced apart in defined positions and is transformed to the hose 5 through the first holder 4 including the clamps 8. Any local stress or damage or even breakage of the hose 5 across the full length of the hose 5 is thus avoided. With the prior known embodiments the breakage occurred for example due to the jamming or seizure of the holder 4 on the guide rail 2. In the device according to the invention the slider 3 cannot seize even when passing a bending or upon sudden increase of the pulling force because the pulling force is applied directly to the slider and further to the pulling means 6, preferably a steel strand wire. This does not allow the slider 3 to deflect significantly off its ideal position of rest on the rail 2.

The hose 5 may be entirely removed out of its fixed position by loosing the clamps 8 of the holder 4 without pulling out the sliders 3 and the holders 4. It is also possible to use the method of cleaning the perforation holes or the passage section of the hose 5 by producing a temporary stress in the hose by means of mere loosing the clamps 8 of the holder 4 at one end of the hose 5.

It is evident that by dismantling the entire hose 5 along with the holders 4 and sliders 3 using the pulling means 6, for example because of considerable wear of the hose or local damage, the sliders 3 with holders 4 may be used also for installation of a new hose 5.

The device for aeration of liquid vessel is applicable especially to activating and equalization vessels or tanks of sewage plants and to tanks for treatment and storage of drinking and supply water as well as to other cases where it is necessary to ensure effective aeration of the liquid in a vessel.

I claim:

1. A device for aeration of a liquid vessel comprising at least one guide rail and a plurality of sliders arranged thereon and the sliders include holders carrying at least one hose of which at least a portion is perforated and the device further comprises pulling means for the hose characterized in that the hose /5/ is movable along its axis with respect to said holders /4/ wherein the holders /4/ have a closed circular shape and their sliders /3/ are connected to pulling means /6/.

2. A device according to claim 1 characterized in that each bending of the hose /5/ is in the working position provided by stiffening formed of a resilient member /9/ located outside or inside of the passage section of the hose /5/.

3. A device according to claim 1 characterized in that at least one slider /3/ is supported by the rail /2/ by means of a rolling element /12/.

4. A device according to claim 3 characterized in that each bending of the hose /5/ is in the working position provided by stiffening formed of a resilient member /9/ located outside or inside of the passage section of the hose /5/.

5. A device according to claim 1 characterized in that both ends of the hose /5/ are stiffened by an inserted body /7/ and at least one holder engaging the stiffened portion of the hose /5/ is provided by clamps /8/.

6. A device according to claim 5 characterized in that each bending of the hose /5/ is in the working position provided by stiffening formed of a resilient member /9/ located outside or inside of the passage section of the hose /5/.

7. A device according to claim 1 characterized in that each slider /3/ is provided by a passage /10/ for pulling means /6/ and in the passage /10/ is provided a fastening element /11/.

8. A device according to claim 7 characterized in that each bending of the hose /5/ is in the working position provided by stiffening formed of a resilient member /9/ located outside or inside of the passage section of the hose /5/.

9. A device according to claim 7 wherein the fastening element comprises a bolt.

10. A device according to claim 7 characterized in that at least one slider /3/ is supported by the rail /2/ by means of a rolling element /12/.

11. A device according to claim 10 characterized in that each bending of the hose /5/ is in the working position provided by stiffening formed of a resilient member /9/ located outside or inside of the passage section of the hose /5/.

12. A device according to claim 10 characterized in that both ends of the hose /5/ are stiffened by an inserted body /7/ and at least one holder engaging the stiffened portion of the hose /5/ is provided by clamps /8/.

13. A device according to claim 12 characterized in that each bending of the hose /5/ is in the working position provided by stiffening formed of a resilient member /9/ located outside or inside of the passage section of the hose /5/.

* * * * *